United States Patent [19]
Bouglé

[11] Patent Number: 4,652,985
[45] Date of Patent: Mar. 24, 1987

[54] INPUT REGULATED HIGH VOLTAGE D.C. POWER SUPPLY SYSTEM

[75] Inventor: Jean Bouglé, Meudon, France

[73] Assignee: Thomson-CGR, Paris, France

[21] Appl. No.: 563,432

[22] Filed: Dec. 20, 1983

[30] Foreign Application Priority Data

Dec. 21, 1982 [FR] France .................. 82 21398

[51] Int. Cl.[4] ........................................ H02M 5/451
[52] U.S. Cl. ............................... 363/37; 363/28;
363/96; 363/124; 363/136; 378/112
[58] Field of Search .................. 363/27, 370, 47, 48,
363/60, 61, 96, 124, 136, 28, 36; 378/101, 104,
111, 112

[56] References Cited

U.S. PATENT DOCUMENTS

| 3,510,753 | 5/1970 | Lawn | 363/47 |
|---|---|---|---|
| 3,818,306 | 6/1974 | Marini | 363/124 |
| 3,821,630 | 6/1974 | Kornrumpf et al. | 363/96 |
| 3,930,193 | 12/1975 | Kornrumpf et al. | 363/37 |
| 3,986,100 | 10/1976 | Brierholm et al. | 363/37 |
| 4,024,453 | 5/1977 | Corry | 321/2 |
| 4,042,871 | 8/1977 | Grubbs et al. | 363/61 |
| 4,074,345 | 2/1978 | Ackermann | 363/48 |
| 4,220,989 | 9/1980 | Perilstein | 363/96 |
| 4,221,968 | 9/1980 | Franke | 378/101 |
| 4,247,887 | 1/1981 | Chin | 363/37 |
| 4,272,716 | 6/1981 | Etienne | 363/27 |
| 4,277,728 | 7/1981 | Stevens | 363/37 |
| 4,293,904 | 10/1981 | Brooks et al. | 363/136 |
| 4,295,049 | 10/1981 | Ebersberger et al. | 378/112 |
| 4,350,891 | 9/1982 | Wuerflein | 378/110 |
| 4,445,166 | 4/1984 | Berglund et al. | 363/61 |

FOREIGN PATENT DOCUMENTS 2293825 7/1976 France .
2427728 12/1979 France .
2085677 4/1982 United Kingdom .

Primary Examiner—Patrick R. Salce
Assistant Examiner—Jeffrey Sterrett
Attorney, Agent, or Firm—Pollock, VandeSande & Priddy

[57] ABSTRACT

According to the invention, the system comprises a resonance type inverter, a diode rectifier bridge and single regulation loop controlling controlled switching means, forming a chopper, interconnected between the rectifier bridge and the inverter. The system is applied to X-ray equipment.

4 Claims, 3 Drawing Figures

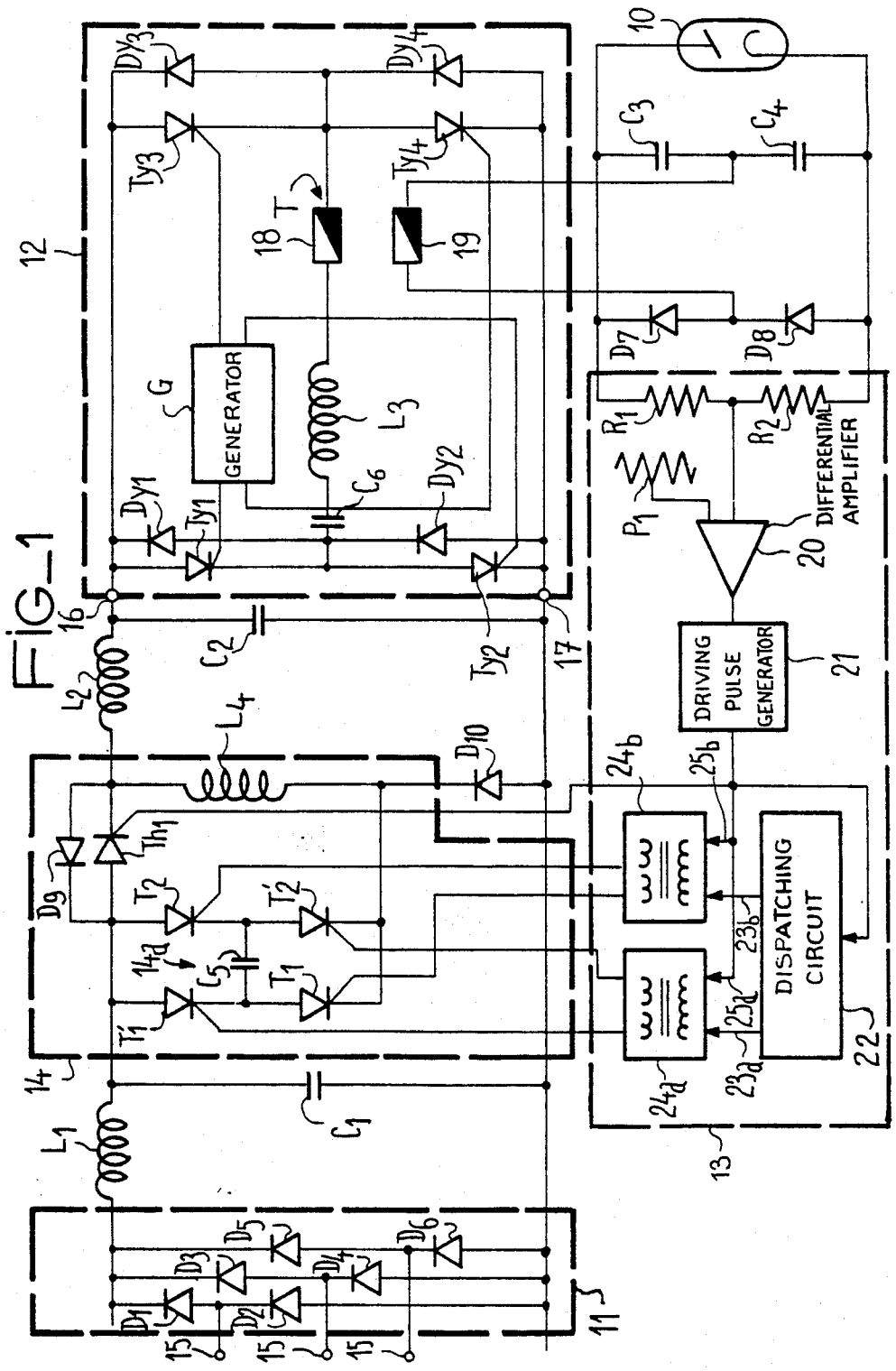

FIG_2
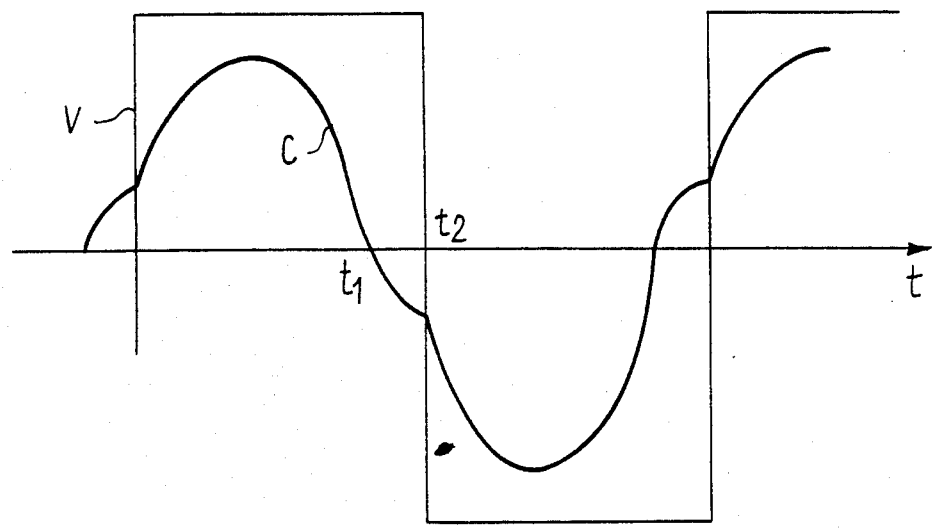
FIG_3
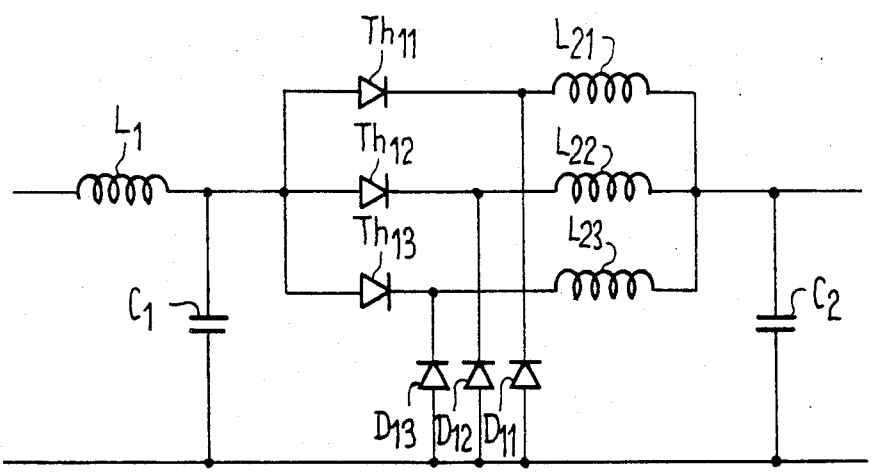

INPUT REGULATED HIGH VOLTAGE D.C. POWER SUPPLY SYSTEM

BACKGROUND OF THE INVENTION

The present invention concerns a high voltage supply system of a load, this load being able to be, more particularly, an X-ray generator for medical or industrial application. The invention concerns more particularly a simplification of the voltage adjustment and regulation means applied to the load, as well as a reduction in the residual undulation ratio of this voltage.

A high voltage supply system of an X-ray generator essentially constituted by a rectifier bridge, by a resonance type thyristor-inverter supplied by the rectifier bridge and by adjustment and regulation means admitting as error voltage a signal representative of the voltage applied to the terminals of the load is already known. In this type of system, it is difficult to cause to vary the voltage supplied to the load through the entire range of variations required. By way of example, a system comprising two adjustment and regulation loops has been proposed, one of the loops acting on the rectifier bridge in order to vary the value of the direct voltage applied to the inverter; the other loop acting on the operating frequency of the inverter. The first adjustment and regulation loop thus allows a rough voltage adjustment whereas the second allows a fine adjustment. Such a system is described in detail in French patent No. 2 451 149 (Also U.S. Pat. No. 4,295,049).

This system is complicated since it requires two adjustment and regulation loops. Furthermore, the rectifier bridge must be equipped with thyristors, or similar switchover components, that are expensive components. Furthermore and above all, there is a real drawback in causing to vary the frequency of the inverter. Indeed, its operating is optimal when the oscillating frequency is selected slightly lower than the resonance frequency of an oscillating circuit including the primary winding of the raising transformer of this inverter. By decreasing the operating frequency with respect to this optimal value, it is effectively possible to cause to decrease, within a limited range, the output voltage supplied by the inverter (which is done by the second adjustment and regulation loop mentioned herein above), but at the expense of a notable increase in the residual undulation of the direct current voltage applied to the X-ray generator.

SUMMARY OF THE INVENTION

The present invention allows to overcome all of these drawbacks.

In this way, the invention concerns essentially a high voltage supply system of a load, such as, for example, an X-Ray generator, comprising a rectifier bridge, a resonance type inverter supplied by the said rectifying bridge and adjustment and regultion means in order to stabilize the voltage supplied to this load by the inverter at an adjustable predetermined value, in which the inverter is driven at a predetermined operating frequency, wherein controlled switchover means forming chopper are inserted between the rectifier and the inverter and in which the switchover means are driven by the adjustment and regulation means.

Thus, the operating frequency of the inverter can be adjusted a single definitive time at a slightly lower value than the resonance frequency of the above-mentioned oscillating circuit, which thus allows to obtain a low residual undulation ratio for the entire range of voltage variations of the supply system. Furthermore, the rectifier bridge is a simple diode Graetz rectifier, which overcomes the need to use expensive thyristors at this place. A single regulation loop controls the operation of the chopper. The operating frequency of this latter is high, in the order of several kHz. Its responding speed is thus clearly better than that of a thyristor Graetz rectifier operating at the power supply frequency. On the other hand, the filtering is easier at this frequency and with respect to the power supply lines, the system presents a better cos $\phi$.

BRIEF DESCRIPTION OF THE DRAWINGS

The invention will be better understood and other advantages inherent therein will become more obvious from reading through the following description of a high voltage supply system that conforms to the invention principles, given simply by way of example and with reference to the annexed drawings in which:

FIG. 1 is a basic scheme of a high voltage supply system according to the invention;

FIG. 2 is a graph illustrating the operation of the inverter and

FIG. 3 illustrates a possible variant of the switchover means forming chopper.

DESCRIPTION OF THE PREFERRED EMBODIMENT

The circuit diagram of FIG. 1 represents a supply system of a load 10 that is an X-ray generator tube. This system essentially consists of a diode rectifier bridge 11, a resonance type inverter 12, adjustment and regulation means 13 in order to stabilize the voltage supplied to the load 10 by the inverter at an adjustable predetermined value and controlled switchover means 14, forming chopper, interconnected between the rectifier bridge and the inverter. The rectifier bridge 11 is a standard six diodes $D_1$-$D_6$ GRAETZ rectifier connected to a distribution power supply of three phase alternate current 15. The output of the rectifier bridge 11 is connected to the input of a quadripole forming a wave filter comprising an inductance $L_1$ in line and a capacitor $C_1$ in parallel. This quadripole is mounted in cascade with means 14 forming chopper, the common point of the inductance $L_1$ and the capacitor $C_1$ being connected to the anode of a thyristor $Th_1$, constituting the main switchable element of the means 14, which are described in detail herein below. The output of the controlled switchable means 14 is connected in cascade at the input of another quadripole forming wave filter, comprising an inductance $L_2$ in line and a capacitor $C_2$ in parallel. The output of this quadripole is connected to the supply terinals 16, 17 of the inverter 12. This is of a known type called "resonance inverter", i.e. constituted by a bridging connection of four thyristors $Ty_1$, $Ty_2$, $Ty_3$ and $Ty_4$. One diagonal of the bridge is constituted by the supply terminals 16, 17 and thus receives a direct voltage supply whereas the other diagonal is constituted by a connection in series of a capacitor $C_6$, an inductance $L_3$ and the primary winding 18 of a raising transformer T. Booster diodes $Dy_1$-$Dy_4$ are respectively connected in anti-parallel to the terminals of thyristors $Ty_1$-$Ty_4$. A control pulses generator circuit G drives, on the one hand, the control electrodes or triggers of two thyristors $Ty_1$ and $Ty_4$ belonging to two different branches of the bridge to apply the supply voltage to the oscillating circuit constituted by the capacitor $C_6$ and the inductances $L_3$ and raising transformer primary winding 18 according a possible polarity, and, on the other hand, the control electrodes of the two other thyristors $T_{y2}$, $T_{y3}$ to apply the supply voltage to the same oscillating circuit, according to the other possible polarity.

The secondary winding 19 of the raising transformer T is connected to the load 10 through the intermediary of a known bridging connection forming a voltage doubler and constitued by two diodes $D_7$, $D_8$ in series, and two capacitors in series, the load 10 being connected to common points of the diodes and capacitors and the secondary winding being connected between the common point of the two diodes and the common point of the two capacitors. A voltage divider formed of two resistances $R_1$, $R_2$ in series, connected in parallel on the load 10, constitutes the first element of the adjustment and regulation means 13 mentioned hereinabove. The common point of resistances $R_1$ and $R_2$ is connected at one input of a differential amplifier 20 so that it receives on its other input an adjustable reference voltage controlled by a potentiometer $P_1$. The amplifier output is connected to a standard circuit 21 forming a driving pulse generator. These pulses of variable duration ensure the control of the thyristor $Th_1$. The switching on of the thyristor is initiated in synchronization with each rising impulse front whereas the switching off of this same thyristor is controlled from each falling front. For this, the output of the circuit 21 is connected to the input of a dispatching circuit 22 (of the flip-flop type) that is connected by two outputs to the respective validation inputs 23a, 23b of two driving circuits 24a, 24b each controlling two thyristors (T, and $T_2$, $T'_2$ and $T_1'$ and respectively) of the extinction circuit 14a of the thyristor $Th_1$. The driving circuits can comprise double secondary winding pulse transformers allowing the simultaneous switching on of the two corresponding thyristors, while insulating them galvanically from each other. Each driving circuit 24a, 24b comprises a control input 25a, 25b sensitive to a falling impulse front and connected to the output of the circuit 21. Such a driving circuit thus produces control impulses for the thyristors to which it is connected, in synchronism with a falling front of an output impulse of circuit 21 and to the condition that its input 23 has received a validation signal from the dispatching circuit 22. Thus the thyristor $Th_1$ will be directly switched on at each rising front of an impulse supplied by the generator 21 and will be switched off with the falling front of this same impulse, the extinction circuit 14a being alternately switched on by the thyristors $T_1$, $T'_1$ and $T_2$, $T'_2$. This extinction circuit principally comprises a capacitor $C_5$ (the load of which is controlled by four thyristors $T_1$-$T'_1$, $T_2$-$T'_2$), an inductance $L_4$ and a diode $D_9$ connected in anti-parallel between the anode and the cathode of the thyristor $Th_1$. The inductance $L_4$ is in series with a diode $D_{10}$ called "free wheeling" diode of the wave filter $L_2$-$C_2$ and the assembly is connected in parallel to the input of this quadripole, the inductance $L_4$ being connected to the cathode of the thyristor $Th_1$. The thyristors $T_1$ and $T'_1$ are connected in series as well as the thyristors $T_2$ and $T'_2$, these two branches being connected in parallel between the anode of thyristor $Th_1$ and the common point of the inductance $L_4$ and the diode $D_{10}$. The capacitor $C_5$ is connected between the common point of the thyristors $T_1$, $T'_1$ and the common point of the thyristors $T_2$, $T'_2$. Capacitor $C_5$ and diode $L_4$ form an oscillating circuit calculated to control the discharge of the capacitor $C_5$ during a time sufficient to suppress the current of the thyristor $Th_1$ and maintain it in this state during an interval of time longer than its deenergizing time.

The general operation of the system that is described hereinabove is the following.

The oscillating circuit of the inverter, formed by the capacitor $C_3$, the inductance $L_3$ and the primary winding 18, at a given resonance frequency and the operating frequency of the inverter, imposed by the generator G is fixed and chosen slightly lower than this resonance frequency. FIG. 2 represents the voltage-current relation in the oscillating circuit. Voltage V has the form of a rectangular wave since it is imposed by thyristor switchings. The current C is almost sinusoidal, it is reduced to zero at the instant $t_1$ and reverts. Since the two corresponding thyristors cannot be conductive in reverse, the current is discharged by associated booster diodes. At instant $t_2$, the two other thyristors of the bridge are switched on. The interval $T_1$-$T_2$ corresponding to the advance of the current with respect to the voltage is selected higher than the switching off time of the thyristors. The voltage collected at the secondary winding 19 of the transformer is rectified and doubled by the diodes circuit $D_7$, $D_8$ and capacitors $C_3$, $C_4$ to be applied to the X-ray generator tube 10. The adjustment and regulation means 13 driven by the voltage at the terminals of the load allow to cause to vary the cyclic conduction ratio of the thyristor $Th_1$; i.e. to cause to vary in consequence the supply voltage of the inverter 12, applied between the terminals 16, 17. According to the invention, a single static switch, the thyristor $Th_1$, allows to compensate the variations of the supply network and to maintain the high voltage value at the requested value. The operating frequency is high, a minimum of several kHz, and the response speed of the system is high, clearly higher than that of systems operating at the power supply frequency. With respect to a phase controlled Graetz rectifier, the chopper system presents a better cos $\phi$ and the filtering of the output voltage is much easier.

The particular operating of the controlled switching means 14 is the following. At each rising front of an impulse supplied by the circuit 21, the thyristor $Th_1$ is switched on. If it is supposed that capacitor $C_5$ has been previously loaded by the switching on of the two thryistors $T_1$ and $T'_1$ it is possible to provoke the extinction of thyristor $Th_1$ by switching on of the thyristors $T_2$, $T'_1$ at the end of the impulse supplied by the circuit 21. This initiation of conducting or switching on of the thyristors $T_2$, $T'_1$ will be controlled by circuit 24b previously validated by the dispatching circuit 22. Capacitor $C_5$ will thus be discharged by first reducing to zero the current through the thyristor $Th_1$, a condition of its switching off, then in flowing through diode $D_9$, this during a time longer than the switching off time of the thyristor. On the other hand, as capacitor $C_5$ and inductance $L_4$ define an oscillating circuit (calculated to guarantee a discharge time of the capacitor longer than the switching off time of the thyristor) the voltage will reverse at the terminals of the capacitor $C_5$ so that it will be recharged with a reverse polarity with a view to the next switching off of the thyristor $Th_1$, which will occur this time by the switching on of the thyristors $T_1$, $T'_2$.

Of course, the structure of the controlled switching means 14 is not limited to the embodiments of FIG. 1. In particular, when the electric power required of the system is not too high, it becomes advantageous to use one or several transistors instead of the thyristor $Th_1$, which thus greatly simplifies the control arrangement of the chopper and allows to operate at a higher frequency, further facilitating filtering of the output voltage. Furthermore, it is possible both to increase the power available and improve filtering by using a polyphased chopper as illustrated on FIG. 3 where the switching on and off circuits have not been represented but obviously derive from those of FIG. 1. According to this variant, the thyristor $Th_1$ is replaced by three thyristors $Th_{11}$, $Th_{12}$, $Th_{13}$. The anodes of these thyristors are common and connected as described herein above to the inductance $L_1$. Their cathodes are respectively connected to inductances $L_{21}$, $L_{22}$ and $L_{23}$ forming with capacitor $C_2$ a wave filter. Each inductance is also associated to its own diode called "free wheeling" diode $D_{11}$, $D_{12}$ and $D_{13}$. The three thyristors are controlled to function at the same frequency but dephased by $2\pi/3$ relative to one another. Operating takes place as if there was a single chopper three times more powerful and functioning at a triple frequency.

Furthermore, especially when the system is used in Radiology, it becomes advantageous to set the operation time (exposure time) by monitoring the switchover means 14, forming chopper. This is the most precise method to accurately control the beginning and the end of X ray exposure.

I claim:

1. An X-ray generator high voltage supply system, the system including a power supply, the system comprising:
    a rectifier bridge having AC voltage inputted thereto;
    a first wave filter connected to the rectifier bridge for producing a dc signal;
    chopper means connected to the first wave filter for generating a pulse signal at a frequency substantially higher than the frequency of the power supply, the chopper means including a switching means;
    a second wave filter connected to the chopper means for filtering the pulse signal;
    a resonance type inverter connected to the second wave filter for receiving the filtered signal and for supplying a substantially ripple-free dc voltage having quick rise and fall times to the X-ray generator, the inverter operating at a predetermined frequency;
    regulation means connected to the X-ray generator for sensing the dc voltage, the regulation means using the sensed dc voltage for regulating the pulse signal produced by the chopper means by varying the duty cycle of the switching means, the regulation means including:
    a voltage divider connected to the X-ray generator for producing an error voltage signal;
    means for generating an adjustable reference voltage signal;
    a differential amplifier having a first input connected to the voltage divider and a second input connected to the adjustable reference voltage means for producing a difference signal;
    means for receiving the difference signal and for generating a driving pulse signal from the diffrence signal;
    wherein the driving pulse signal is transmitted as a control pulse signal for activating and deactivating the switching means.

2. A supply system according to claim 1, wherein said rectifier bridge is a diode bridge.

3. A supply system according to claim 1, wherein said predetermined operating frequency of said inverter is selected slightly lower than its own resonance frequency.

4. A supply system according to claim 1, wherein said chopper means comprises a plurality of static switches having control inputs respectively driven by outphased signals produced by said regulation means.

* * * * *